2,829,116

PREPARATION OF OXIDATION CATALYTIC UNITS

Wendal A. Alexander, Ottawa, Ontario, Canada, assignor to National Research Council, Ottawa, Ontario, Canada, a body corporate No Drawing. Application February 2, 1953
Serial No. 334,728

7 Claims. (Cl. 252—473)

The present invention relates to a novel and improved silver catalyst unit for oxidation reactions, such as the oxidation of ethylene and to a method of preparing silver catalysts for use in such oxidation reactions.

Objects and advantages of the invention will be set forth in part hereinafter and in part will be obvious herefrom, or may be learned by practice with the invention, the same being realized and attained by means of the processes, steps, compositions and instrumentalities pointed out in the appended claims.

The invention consists in the novel processes, steps and improvements herein shown and described.

The present invention has for its object the provision of a novel and improved process for the production of oxidation catalysts which have an unusually long life, are highly effective, and can be economically produced for commercial use. The invention further provides catalytic members in which a thick layer of the active catalytic substance may be formed on a member which has good or high heat conductivity and to which the catalytic substance is firmly bonded so that it does not tend to loosen from its supporting layer, and at the same time has excellent heat transfer to the supporting layer, whereby the danger of explosion during the oxidation reaction is minimized. A further object of the invention is the provision of a novel, simple and improved process by which the thickness of the layer of the catalytic substance may be accurately controlled to provide a relatively thick layer of long life and of good heat transfer properties. Still another object is the provision of a novel and improved catalytic unit which can be easily fabricated in sheet form and then worked to the desired shape before activation, and at a lower cost than heretofore possible with catalysts of silver-alkaline earth metal alloy. The invention further provides a silver-alkaline earth metal alloy for catalytic activation which is integrally bonded to a heat conductive metal base and has superior adherence on the metal base.

In many respects the present invention is an improvement of the oxidation catalyst disclosed in the prior United States patent to Adrien Cambron and Francis L. W. McKim, No. 2,562,858, granted July 31, 1951, but in other respects the present invention is of wider application.

As disclosed in said patent, the catalytic substance preferably comprises a silver-base alloy including from 1% to 75% of alkaline earth metal, such as calcium, the silver-base alloy being finely comminuted and treated to remove at least 5% of the alkaline earth metal from the silver-base alloy without significant removal of the silver. Such a catalyst may be used in its comminuted form or may be made into a paste which may be supported on a silver or other metallic support.

It has also been proposed to compact the comminuted paste of catalytic silver alloy after it has been applied to the metallic support so as to increase its adherence on the metallic support and to lengthen the useful life of the supported catalyst. However, in actual practice, the comminuted material, even after compaction, tends to crack or peel away from the metallic support during fabrication, and the active catalyst layer does not have the same thermal transfer to the metallic support as can be achieved with the integral bonding of the layers in accordance with the process of the present invention. Consequently, the catalysts of the present invention can be operated at a more uniform temperature and are better adapted to carry away the heat of reaction, thereby minimizing the explosion hazard.

According to the present invention, the metallic supporting member is a clean sheet of silver, silver-plated or sheathed metal such as copper, aluminum or stainless steel, or alternatively solid magnesium, aluminum or stainless steel, not plated with silver, advantageously having a thickness of at least 0.012 cm. and preferably at least about 0.025 cm. If desired, the metallic supporting member may comprise silver-clad base metal such as aluminum or copper, or aluminum coated with welded, electrodeposited or sprayed silver. Where the base metal is copper or a copper bearing alloy it is highly desirable that the silver layer should be sufficiently thick to be substantially impervious, thereby preventing the gas mixture from being in contact with the copper, which would impair the production of ethylene oxide.

The minimum thickness of the silver-alkaline earth metal catalytic layer on the base metal is usually about 0.001" thick, and for practical purposes there is no maximum limit of thickness for the catalytic layer thickness, although in actual practice it is found that there is no practical advantage achieved by using layers thicker than 0.020" and prolonged catalytic activity is best achieved in most cases with a layer which is at least 0.005" thick.

The catalyst in the form of an alloy, may be mounted on one side of the base sheet metal or on both, dependent upon the manner in which the catalyst is to be used. The final catalytic alloy on the surface of the metallic base comprises silver alloyed with from about 1% to about 75% of one or more alkaline earth metals, preferably calcium with small amounts of magnesium, and if desired traces of nickel may be added. These alkaline earth metals and silver are melted and applied to the metal supporting member by dipping the metallic supporting member in, and long enough to be wetted by, the molten silver-alkaline earth metal alloy to provide a silver-alkaline earth metal layer firmly adherent on and firmly bonded with the metallic support and integral with the main body of the metallic support.

When the catalytic alloy is applied at temperatures in excess of about 550° C. the operations are preferably carried out in an inert atmosphere, such as helium or argon, but where the dipping is carried out at the lower temperatures, it may often be satisfactorily carried out in air without the protection of an inert atmosphere.

After the desired thickness of silver-alkaline earth metal catalyst has been applied to the surfaces of the metallic support, the catalyst unit may be annealed and allowed to cool although annealing is often unnecessary.

Various treatments following the annealing step have also been found to be highly desirable in connection with the catalyst alloys used with the present invention, as certain compositions or crystalline structures of the catalyst alloys in the coating layer adherent on the base metal sheet have been found to resist removal of the alkaline earth metal in the activating treatment. Where this occurs due to the coherent nature of the surface layer, a simple rolling operation serves to open up the surface of the layer of the alloy coating so that it is thereafter activated by the treatment above referred to, and successive rolling operations can be performed if the rolls are roughened so as to prevent continued smoothing of the layer of catalytic alloy.

Also, it is sometimes found that the surface of the catalytic alloy coating may become oxidized or nitrided as the layer is cooled in air after the dipping operation or during the annealing operation, and the deleterious effect of the thin oxide or nitride layer is advantageously eliminated by abrading the surface of the catalytic alloy to remove the thin layer of the oxide or nitride film. Such abrasive action may be carried out either by wire-brushing, sand-blasting, shot-blasting, or other abrading operations.

The catalytic alloy is then treated to activate the catalyst, such treatment generally being in accordance with the process of activation generally disclosed in the prior patent to Cambron and McKim, referred to above. According to this process the silver base alloy is treated with hot water or steam, acid or otherwise to remove a substantial portion of the alkaline earth metal from the exposed surface of the silver alloy, at least 5% of the alkaline earth metal being generally removed from the alloy on the surface portion of the catalytic unit, so that the final surface of the catalyst alloy does not include more than about 71% of alkaline earth metal, although the under portions of the alloy may contain a less amount of silver.

It will be understood that the foregoing general description and the following detailed description as well are exemplary and explanatory of the invention but are not restrictive thereof.

Referring now in more detail to the present preferred and illustrative manner in which the process of the present invention is put into practice, the surface of the sheet metal (silver, magnesium, copper, aluminum or stainless steel) base is first cleaned so as to insure ready and complete wetting of the metal surface of the catalytic base member. The base is formed of metal of good heat conductivity and of sufficient thickness so that the base has good mechanical strength. The thickness of the metal base may vary from about 0.015 cm. up to any practical maximum thickness, but generally it is preferred to use a thickness of from about 0.025 to about 0.12 cm.

The silver-alkaline earth metal alloy in which the metal sheets are to be dipped comprises silver and one, two or more of the alkaline earth metals. Such molten metal may contain a minor amount of nickel, although the inclusion of the nickel is not essential to the production of a commercially useful catalytic alloy for the oxidation of ethylene and other hydrocarbons. It is advantageous to dip the metal sheet into a molten bath of silver and one, two or more of the alkaline earths, proportioned approximately to form a eutectic or low melting silver-alkaline-earth metal alloy, which alloy wets the clean surface of the metal sheet, and adheres thereto as a layer when the metal sheet is removed from the molten bath, the thickness of the metal alloy layer depending on temperature, whether or not the surface of the sheet is wiped, and on how much of the metal alloy is drained off the metal sheet.

Among the alkaline earth metal alloys which are preferred for application to silver surfaces by dipping are the following:

Alloys of silver and alkaline earth metals comprising silver and from 1 to 75% of an alkaline earth metal, preferably calcium.

Alloys of silver and two or more of the alkaline earth metals, preferably the ternary alloys which have compositions, as follows, some of which are substantially eutectic:

| Silver, percent | Calcium, percent | Magnesium, percent | Approx. M. P. °C. |
|---|---|---|---|
| 92 | 5 | 3 | 633 |
| 79.5 | 14.8 | 5.7 | 467 |
| 8 | 75 | 17 | 419 |
| 43 | 17 | 40 | 440 |
| 5 | 75 | 20 | 430 |
| 36.3 | 49.4 | 13.4 | 381 | to any of which alloys may be added small amounts of nickel, preferably in the form of a magnesium-nickel eutectic alloy (23.5% Ni M. P. 507° C.), and satisfactory results are obtained where there is from about 0.1% to about 3.0% of nickel in the bath.

Thus the alloy for application to silver bearing surfaces may comprise alloys of two or more of the alkaline earth metals, or of silver with one or more of the alkaline earth metals. If the alloy is one which is to be applied to a heat-conductive metal base, such as an aluminum, copper, brass or stainless steel base, the alloy comprises a silver-alkaline earth metal alloy which is relatively rich in silver. Those alloys which are relatively poor in silver may be applied to a silver coated or solid silver base, and by the annealing process, the alloys become enriched with silver so that their silver content exceeds 25%. With those alloys which are relatively high in alkaline earth metal content and have a substantial portion of the alkaline earth metal removed from the surface of the alloy by etching, the surface of the alloy is thereby relatively enriched in silver so that it includes at least about 25% silver, and often reaches a silver content as high as 99.9% silver.

Where nickel is used, the etched surface of the alloy will contain from about 24% silver with up to about 3.0% of nickel, if desired, and from about 71% of alkaline earth metal to as little as a trace of alkaline earth metal, the remainder of the alloy being silver.

Thus, the molten bath in its broadest aspects comprises a molten mixture of silver and one, two or more alkaline earth metals, such as calcium, strontium, barium and magnesium, to which may be advantageously added a minor amount of nickel. It is preferable that the molten silver-alkaline earth metal bath should have a composition approximating that of a eutectic alloy of the component metals.

In its simplest form, the molten bath may originally comprise a mixture of silver and one or two alkaline earth metals such as calcium and magnesium, which, when molten, will readily wet and adhere to the surface of the metal sheet to form an alloy of silver and alkaline earth metal adherent thereon. This silver-alkaline earth metal alloy can be etched by treatment with hot water, steam, acid or other material to remove some or most of the alkaline earth metal, as is necessary to activate the alloy and render it catalytic. The eutectic mixtures of silver with calcium and magnesium are advantageous in that they have relatively low melting points, even as low as about 381° C. and may be used, in many instances for alloying with silver, without a surrounding inert atmosphere.

Where additions of nickel are desired, satisfactory results are obtained with metallic nickel present in the molten metal bath from about 0.1% to about 3.0%.

After the base metal has been coated with the alloy layer from which the catalyst is to be formed, it may be annealed at suitable temperatures for the required period of time, and the alloy layer adherent on the base metal is thereafter treated to remove a substantial portion of the calcium or other alkaline earth metals so as to activate the silver-base alloy, the final activated catalytic alloy containing less than about 71% alkaline earth metal.

Examples of typical methods according to the present invention used in the preparation of catalytic units with the alloy adherently coated onto the surface of the base member by means of dipping the base member into a molten bath of the silver-alkaline earth metal alloy, follow. It is to be understood that although a silver base member is illustratively used in some of the following examples, the base member may equally well be of aluminum, copper, and that alloys of silver with one or more of the alkaline earth metals magnesium, strontium and barium may be used in place of the silver calcium alloys referred to in the following examples.

Variations in composition of the silver base alloy dipping bath will cause changes in the melting point of the bath, and the temperature is preferably maintained relatively low to avoid excessive solution of the base metal in the molten bath, while the temperature of the bath during dipping allows the thickness of the coating to be accurately controlled, although the still molten layer of the silver base alloy may be further regulated as to its thickness by wiping or hot-rolling of the coated base metal after dipping.

Where the coating metal or alloy is readily oxidizable a suitable inert atmosphere must be provided during annealing at high temperatures; in this case, argon or helium may be used. Other factors in the annealing process which must be controlled are the usual ones of time and temperature.

Annealing procedures of the alloy of controlled composition produce layers which consist of one or more phases. In the case of silver coated by Ca—Mg eutectic alloy, annealing at 475° C. for one-half hour produces a very brittle alloy layer which appears on etching and metallographic examination to be single phase.

The removal of the activating metals in the outer alloy layer may be effected successfully by steam treatment or other procedures set forth in the prior Patent No. 2,562,858 for silver catalyst materials, or it may be treated as follows:

The catalyst elements may be treated with a mixture of 90% nitrogen and 10% steam at a temperature of 350° C. for one hour and then with steam only, for three hours. The oxidized alloy is then treated with 20% by volume of aqueous acetic acid for one and one-half hours and the solution decanted. The resulting catalytically activated alloy is washed in distilled water and dried.

In the dip-coating procedure with silver-calcium-base or other alkaline earth-base coating alloys on another metal, it is important to achieve a good adherence or wetting of the base metal by the coating liquid. An important point in the technique is to have a substantially oxide free surface on the dipping bath and a silver sheet thoroughly cleaned by degreasing and etching. The bath of e. g., silver-magnesium-calcium eutectic alloy is not sufficiently protected from oxidation and scum formation by an atmosphere of tank argon purified by passing over calcium turnings at 725° C. even with occasional stirring to remove the oxide film. Rapid stirring and immediate immersion of the silver sheet permits satisfactory wetting in most cases with such an argon atmosphere. Dip-coating can be done with a low melting silver-calcium-magnesium eutectic alloy in air by special care in removal of the oxide film from the melt.

*Example 1*

Pure silver sheets, 0.020" thick, were cleaned by degreasing and etching in about 40% nitric acid, after which the silver sheets were dipped in a molten bath comprising about 5% silver, 75% calcium and 20% magnesium for 30 seconds at 460° C. the excess molten alloy being removed by wiping the surface of the dipped sheets with steel wool. The dipping was carried out in air. The sheets were then annealed for a half-hour at 625° C. in an argon atmosphere and rolled between pieces of 48 mesh stainless steel screening to give about 5% reduction in thickness. The rolled alloy-coated sheets were then sandblasted to remove the oxide layer resulting from the dipping and annealing operations, after which the coated sheets were activated by normal treatment with steam at high temperatures (about 350° C.) following by the etching away of the alkaline earth metal from the surface of the sheets by treatment of the sheets with dilute acetic acid, in accordance with the standard treatment described above. The sheets were then cut into convenient sizes and were used at 260° C. for the oxidation of a mixture of ethylene and air flowing at the respective rates of 2 litres and 30 litres per hour. This catalyst showed a lower activity than in Example 2 below, indicating that the thickness of the base metal sheets should have been thicker for the test apparatus, and the results obtained are tabulated, as follows:

| Day No. | Percent $CO_2$ | Percent $C_2H_4O$ | Total reaction, Percent | Yield Percent (Based on $C_2H_4O$) |
|---|---|---|---|---|
| 7 | 67 | 15 | 82 | 18 |
| 14 | 51.5 | 24 | 76 | 32 |
| 20 | 45 | 26 | 71 | 37 |
| 28 | 39 | 25 | 64 | 39 |
| 42 | 47 | 23 | 70 | 33 |

*Example 2*

Fine silver sheets, 0.040" thick, were etched in 40% nitric acid solution and dipped in air in the same alloy as in Example 1, except that the immersion was at 450° and for 25 seconds. The full amount of the adherent alloy was allowed to remain on the sheets without wiping off of the excess, and these coated sheets were then annealed in an argon atmosphere for one hour at 640° C. The pieces were then rolled between sheets of 48 mesh stainless steel screening to give about an 8% reduction in the thickness of the sheets, after which they were sandblasted to remove the surface layer and activated in the same manner as with Example 1. The sheets were then cut into strips of convenient size and were mounted as fins on a ½" aluminum rod and tested for catalytic activity with a flow of ethylene and air at the rates of 2 and 30 litres per hour, and at an operating temperature of 260° C.

The results obtained with this catalyst were as follows:

| Day No. | Percent $CO_2$ | Percent $C_2H_4O$ | Total reaction, Percent | Yield Percent (Based on $C_2H_4O$) |
|---|---|---|---|---|
| 4 | 69 | 28 | 97 | 29 |
| 7 | 61 | 37 | 98 | 38 |
| 11 | 51 | 42 | 93 | 45 |
| 18 | 38 | 42 | 80 | 53 |
| 24 | 37 | 39 | 76 | 52 |

*Example 3*

Strips of silver coated with a silver-calcium-magnesium alloy in substantially the same manner as for Example 2 were annealed in argon for one hour at 475° C. and reduced in thickness 5 to 15% by rolling between sheets of 48 mesh stainless steel screening wire, sandblasted to remove the surface layer, and then activated as with Examples 1 and 2. When tested in the same manner as with Example 2, the following results were obtained.

| Day No. | Percent $CO_2$ | Percent $C_2H_4O$ | Total reaction, Percent | Yield Percent (Based on $C_2H_4O$) |
|---|---|---|---|---|
| 3 | 39 | 42 | 81 | 51.5 |
| 5 | 40 | 45.5 | 86 | 53 |
| 7 | 40.5 | 45 | 86 | 53 |
| 10 | 36 | 40 | 76 | 52 |

*Example 4*

Other entirely satisfactory catalytic units may be prepared from sheet metal, such as silver, aluminum, or magnesium, in the same general manner as set forth above but by dipping the metal sheets into a substantially eutectic alloy comprising about 14.8% calcium, 5.7% magnesium and 79.5% silver, melting about 467° C., after which the sheets are annealed and then sand-blasted or otherwise cleaned, steam treated and etched to activate the catalytic silver-based alloy.

*Example 5*

Similarly, sheet silver or metal having a silver surface may be treated in substantially the same manner specified in Example 4, except that the dipping is in a molten alloy bath which comprises the low melting point silver-calcium-magnesium alloy containing about 75% calcium, 17% magnesium and 8% silver. After coating sheets having surfaces of substantially pure silver, the adherent alloy on the surface of the sheet metal base may be enriched with silver during the immersion or annealing steps to bring the silver content of the catalytic alloy at the surface up to at least 25% silver.

*Example 6*

The procedure of Example 4 may be carried out using a molten alloy which comprises the silver-calcium-magnesium alloy melting at about 440° C. and comprising about 40% magnesium, 17% calcium and 43% silver.

*Example 7*

Freshly pickled fine silver sheet 0.030" thick was dipped at 500° C. in a molten alloy bath comprising silver 79.5%, calcium 14.8% and magnesium 5.7%, the dipping operation being carried out in air while the surface of the silver was rubbed with steel wool. After sand-blasting, steam treatment and etching with acetic acid and cutting to convenient sizes, the sheets were mounted on an aluminum rod and tested in the same ethylene-air mixture flowing over the catalytic unit, giving the following excellent results:

| Day No. | Percent $CO_2$ | Percent $C_2H_4O$ | Total reaction, Percent | Yield, Percent |
|---|---|---|---|---|
| 2 | 43.9 | 43.9 | 87.8 | 50.1 |
| 6 | 45.9 | 44.2 | 90.1 | 49.1 |
| 13 | 42.7 | 40.1 | 82.8 | 48.5 |
| 19 | 36.8 | 39.9 | 76.7 | 52.0 |

*Example 8*

In any of the foregoing examples, a small proportion of nickel may be added to the coating alloy to shorten the period required for the catalytic alloy to reach its maximum activity. Such additions of nickel and preferably from 0.1% to 2.5% of the silver-alkaline earth metal alloy and may be conveniently added to the metal alloy bath as the magnesium-nickel eutectic containing about 23% nickel, melting at about 507° C.

The use of the silver-alkaline earth metal alloys often avoids the need for annealing, and in general, permits the use of shorter annealing times than is possible when silver coated sheets are immersed in alkaline earth metal alloy baths which are thereafter preferably annealed for relatively longer times at a given temperature. The lower annealing temperatures, preferably from about 425° C. to 550° C. result in a higher initial activity of the catalytic alloy thereby avoiding the long initial induction period which is often encountered with alloys which have been annealed at higher temperatures.

Where annealing is desired, and especially where a low grade silver alloy has been applied to a silver coated metal base annealing is carried out for periods in the order about one-half to several hours at temperatures ranging from 400° to 660° C. and preferably from 450° to 650° C. or most advantageously from 500° to 640° C. Where the alloy coating is rich in silver, especially more than 25% silver, annealing may usually be dispensed with, and is almost always not used where the alloy is deposited on a metal surface which is free of silver.

The preferred base metals, for use with the molten alloys which are relatively poor in silver, are pure silver, and metals such as aluminum, steel, copper and magnesium which are provided with external layers of silver, which may be applied to the base metal by electroplating, spraying, welding or other procedures to provide a layer of substantial thickness on the less precious metal.

While the process has been described extensively in connection with the dipping of base metals into a silver-alkaline earth metal alloy while the alloy is molten, similar results can be obtained according to the present invention, by spraying the molten silver based-alkaline earth metal alloy onto a clean metal base, while the metal base and the alloy spray are protected by an inert atmosphere, the sprayed metal forming a somewhat porous adherent alloy layer on the metal base which can readily be activated by somewhat shorter steam and etching or other removal treatments than have been specified for the catalytic alloys which are applied to the base metal by the immersion method.

In the application of the silver-alkaline earth metal alloy to aluminum metal base sheets, difficulty is sometimes experienced with certain of the alloys in securing good adhesion between the molten alloy and the surface of the aluminum metal. This may be largely overcome by coating the base metal with a thin layer of magnesium, even less than 0.001" in thickness. Good adherence may also be achieved by abrading the surface of the base metal sheet while it is immersed in the alloy, and the same procedure may even be applied to the alloy coating of silver sheet.

The invention in its broader aspects is not limited to the specific processes, steps and compositions shown and described but departures may be made therefrom within the scope of the accompanying claims without departing from the principles of the invention and without sacrificing its chief advantages.

What is claimed is:

1. The process of preparing a catalytic unit for the oxidation of hydrocarbons, such as ethylene, which comprises coating a metal surface with a molten mixture of silver and at least one alkaline earth metal to form a silver-alkaline earth metal alloy coating on the metal surface, and removing from at least 5% to all but a trace of the alkaline earth metal from the alloy coating.

2. A process as claimed in claim 1 in which the alloy coating is annealed prior to removal of the portion of the alkaline earth metal from the surface alloy.

3. A process as claimed in claim 1 in which the molten mixture consists essentially of a mixture of silver, calcium and magnesium metals in substantially eutectic proportions.

4. A process as claimed in claim 2 in which the annealing is carried out above 450° C. in an inert atmosphere.

5. A process as claimed in claim 3 in which the molten mixture includes from 0.1% to 2.5% nickel.

6. A process as claimed in claim 5 in which the annealing is carried out in an inert atmosphere at from about 575° C. to 675° C.

7. The process of preparing a catalytic unit for oxidation of hydrocarbons, such as ethylene, which comprises applying a substantially eutectic silver-alkaline earth metal alloy to the surface of a metal sheet to form a silver-alkaine earth alloy layer as an integral coating on said sheet, treating the alloy layer with steam, and removing from at least 5% to all but a trace of the alkaline earth metal from the surface of the alloy to render the alloy catalytically active.

References Cited in the file of this patent

UNITED STATES PATENTS 2,562,858    Cambron et al. _____ July 31, 1951

FOREIGN PATENTS 509,882    Belgium _____ Mar. 31, 1952

OTHER REFERENCES

Burns and Schuh's "Protection Coatings for Metals," New York, 1939, pp. 37–39.